Figure 1:
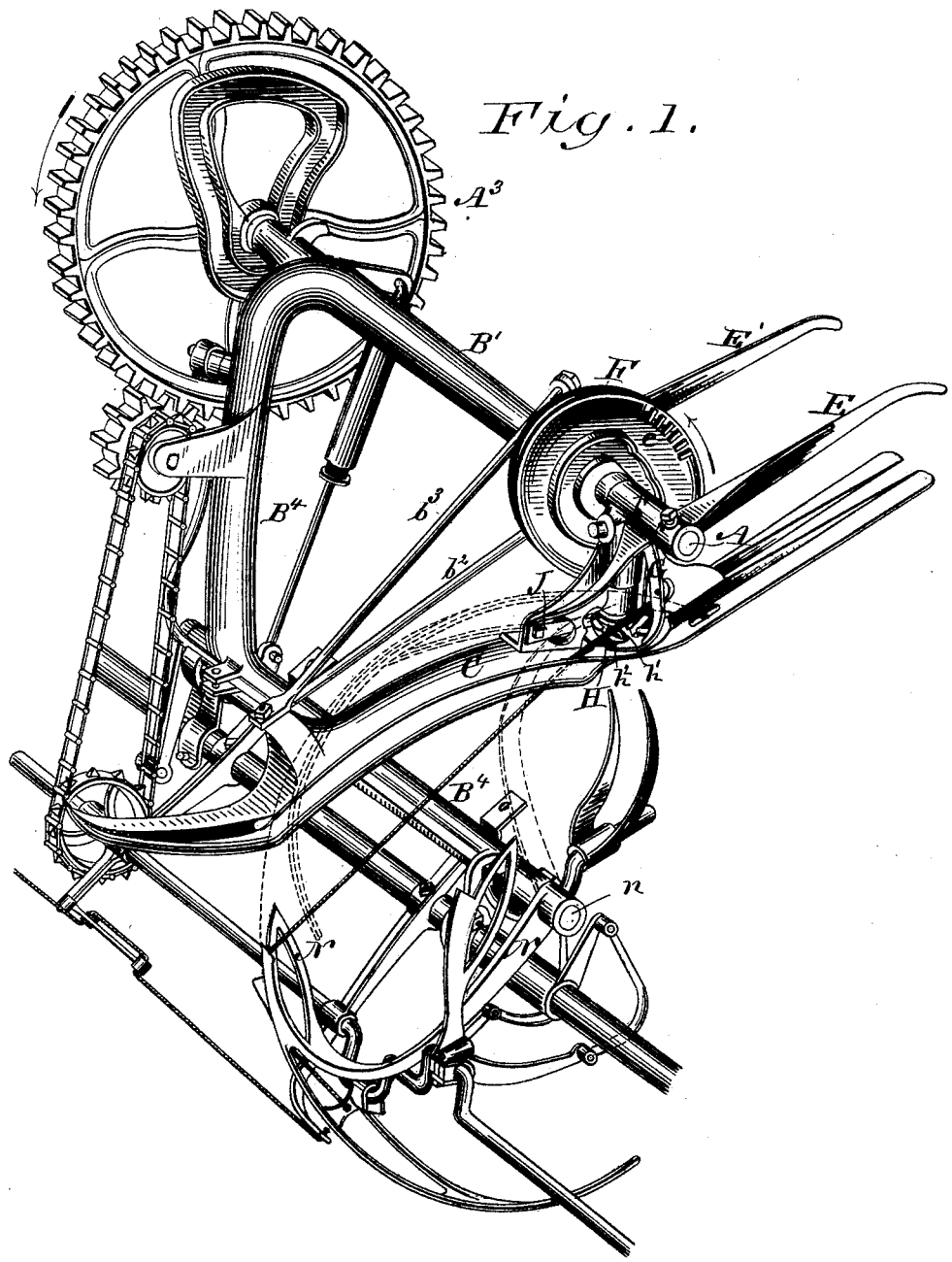

(No Model.) 8 Sheets—Sheet 1.

L. MILLER.
GRAIN BINDER.

No. 410,427. Patented Sept. 3, 1889.

Witnesses
H. C. Newman
E. S. Newman

Inventor
LEWIS MILLER,
By his Attorneys
Baldwin Davidson & Wight (No Model.)  8 Sheets—Sheet 3.

L. MILLER.
GRAIN BINDER.

No. 410,427.  Patented Sept. 3, 1889.

WITNESSES
H. C. Newman,
E. S. Newman,

INVENTOR
LEWIS MILLER,
By Baldwin Davidson & Wight
Attorneys

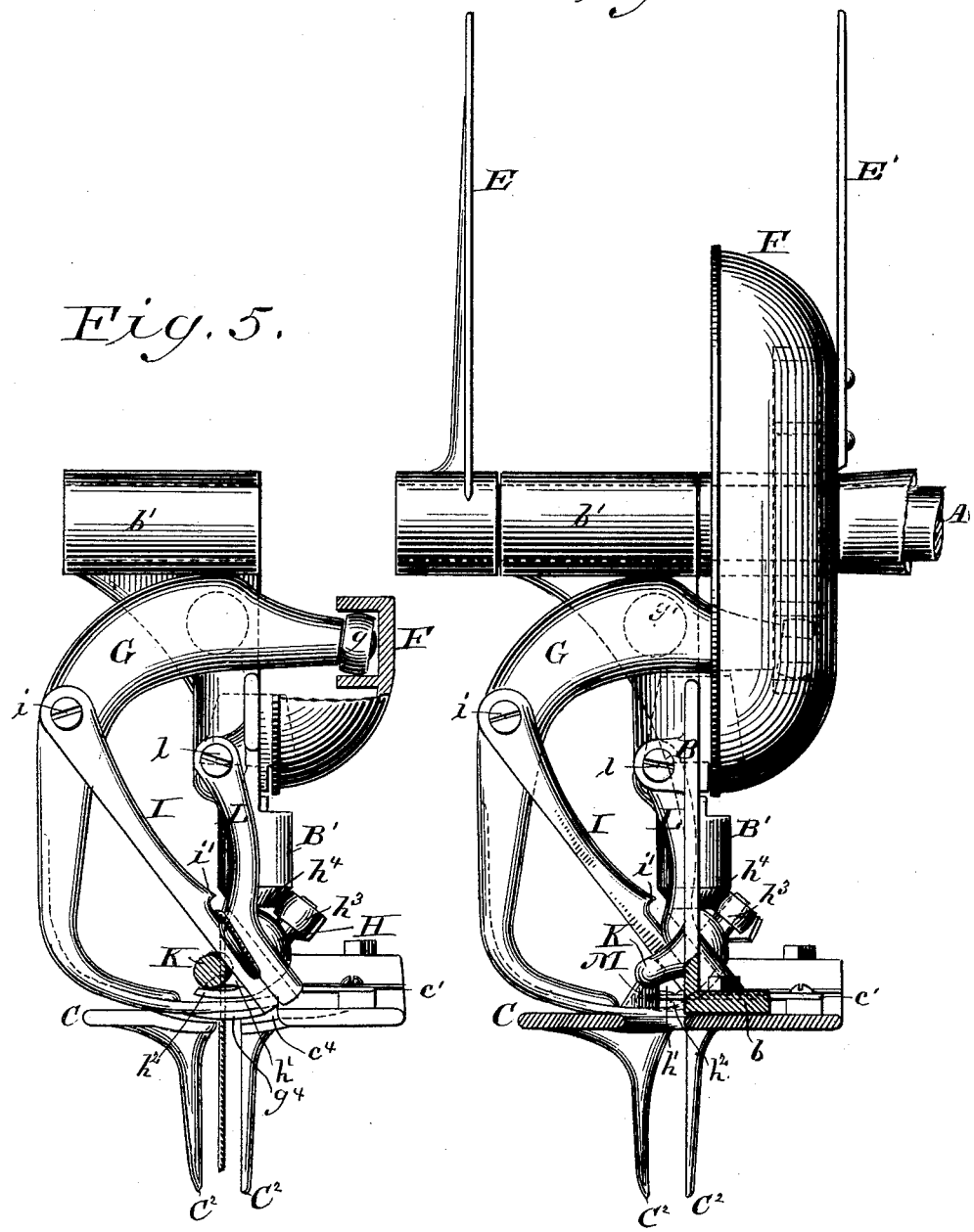

(No Model.) 8 Sheets—Sheet 5.
L. MILLER.
GRAIN BINDER.
No. 410,427. Patented Sept. 3, 1889.
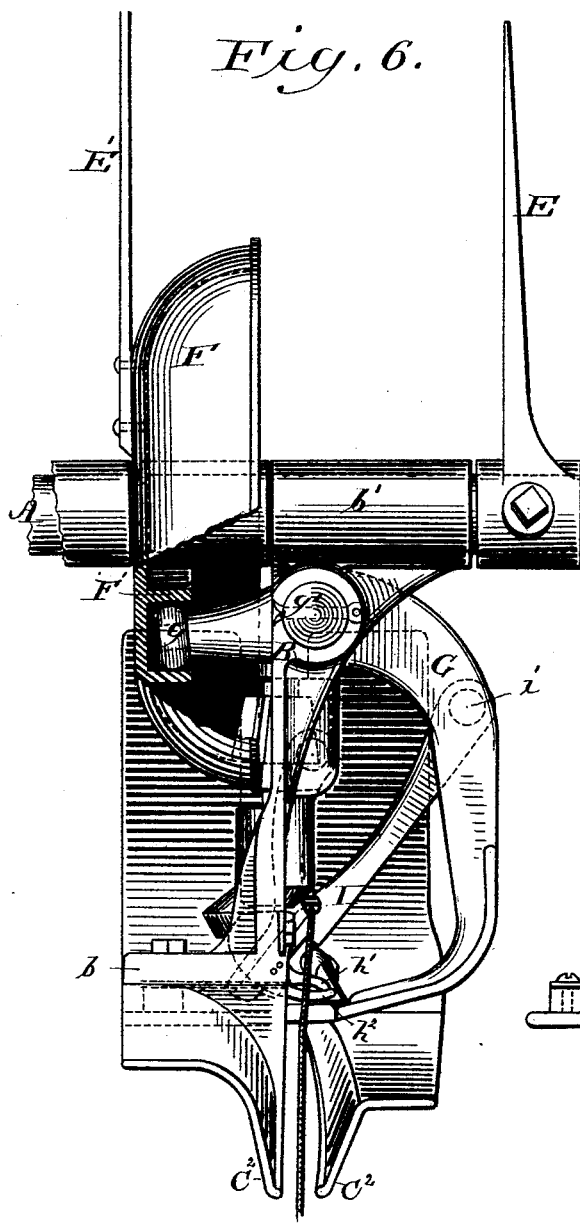
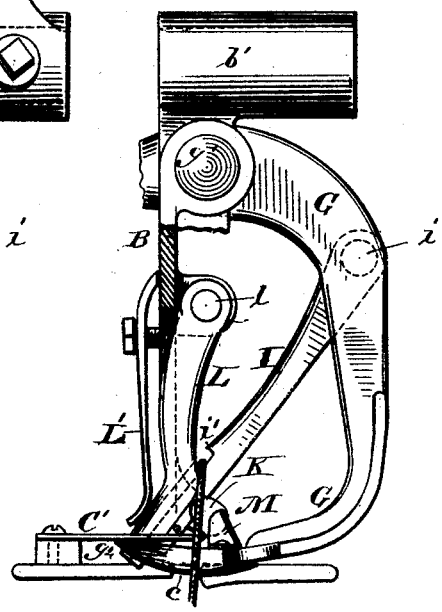
WITNESSES
H. C. Newman,
E. S. Newman.
INVENTOR
LEWIS MILLER,
By Baldwin Davidson & Wright
Attorneys (No Model.) 8 Sheets—Sheet 6.

L. MILLER.
GRAIN BINDER.

No. 410,427. Patented Sept. 3, 1889.

Witnesses
H. C. Newman
E. S. Newman

Inventor
LEWIS MILLER,
By his Attorneys
Baldwin Davidson & Wight

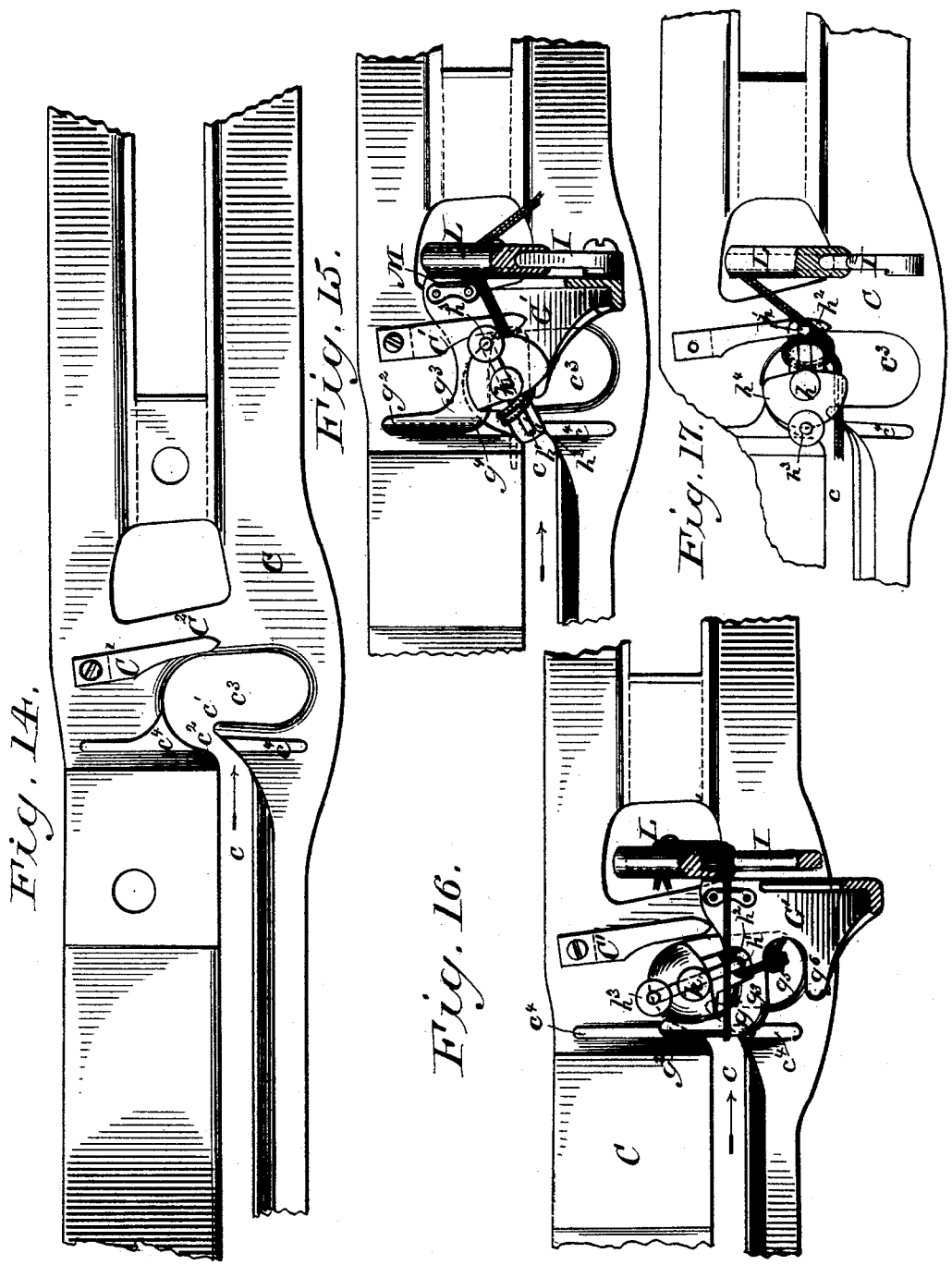

(No Model.) 8 Sheets—Sheet 8.

L. MILLER
GRAIN BINDER.

No. 410,427. Patented Sept. 3, 1889.

Witnesses

Inventor
LEWIS MILLER
By his Attorneys

UNITED STATES PATENT OFFICE.

LEWIS MILLER, OF AKRON, OHIO.

GRAIN-BINDER.

SPECIFICATION forming part of Letters Patent No. 410,427, dated September 3, 1889.

Application filed July 17, 1888. Serial No. 280,169. (No model.)

*To all whom it may concern:*

Be it known that I, LEWIS MILLER, a citizen of the United States, residing at Akron, in the county of Summit and State of Ohio, have invented certain new and useful Improvements in Grain-Binders, of which the following is a specification.

My invention more especially relates to automatic grain-binders of that type known as "cord-knotters," in which the sheaf is bound with cord, and to that class of such binders in which the knot is formed by a tying-bill cooperating with cord carrying and clamping devices.

The objects of my invention are to simplify the apparatus employed while increasing its efficiency. These ends I attain by the employment of the following among other instrumentalities, to wit: a knotter-shield or breast-plate provided with a cord-receiving slot having a guide-finger extending across it, said slot terminating in an enlarged opening having its longer axis at substantially a right angle to the general direction of the slot-opening over which the tying-bill revolves; an elastic or yielding guide-bar traversed by the jaws of the knotter; an elbow-lever carrying a cord-guiding foot vibratable intermittently across the cord-receiving slot; a recess in said foot into which the strands pass and are carried laterally across the slot as the knot is formed, and a bridge, also on said foot, over which the knot is drawn from the bill by a direct pull as the sheaf is discharged. I also employ in combination with these elements a cord-holder consisting of a clamp and sliding jaw, the latter being pivoted on the elbow-lever and vibrating coincidently therewith, a horn or guide on the frame over which the jaw slides, the cord-clamp consisting of an arm or lever vibratable coincidently with the cord-holding jaw and actuated by a spring which maintains constant contact between the jaw and clamp, and a knife on the cord-guiding foot of the elbow-lever to cut the cord.

The subject-matter claimed is hereinafter specifically set forth, and designated in the claims concluding this specification.

My invention contemplates the embodiment in practice of the most complete apparatus of the present state of the art of binding grain automatically.

The accompanying drawings represent so much of the grain-binding mechanism of a harvester embracing all the improvements herein claimed as is necessary to illustrate the subject-matter. Some of the improvements may be used without the others and in mechanism differing somewhat in the details of its construction and organization from that herein shown. Unless otherwise specified the parts are of usual well-known construction.

That side of the apparatus at which the grain is delivered by the apron, elevator, or raking mechanism I term the "feed" or "grain" side. The opposite I term the "discharge" or "stubble" side. That portion nearest the horses I term the "front." The opposite side I term the "rear" of the apparatus.

Figure 2:
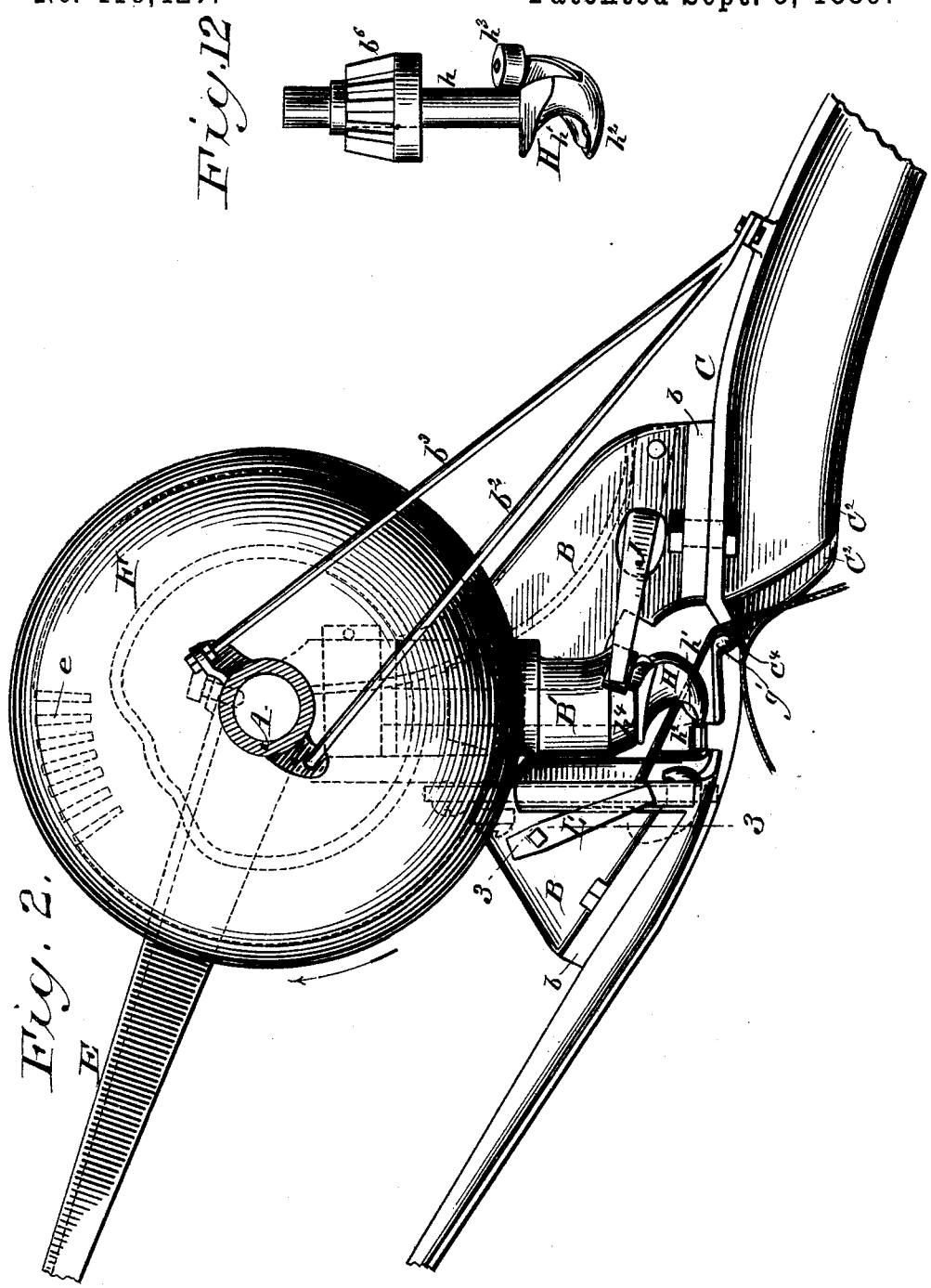
Figure 3:
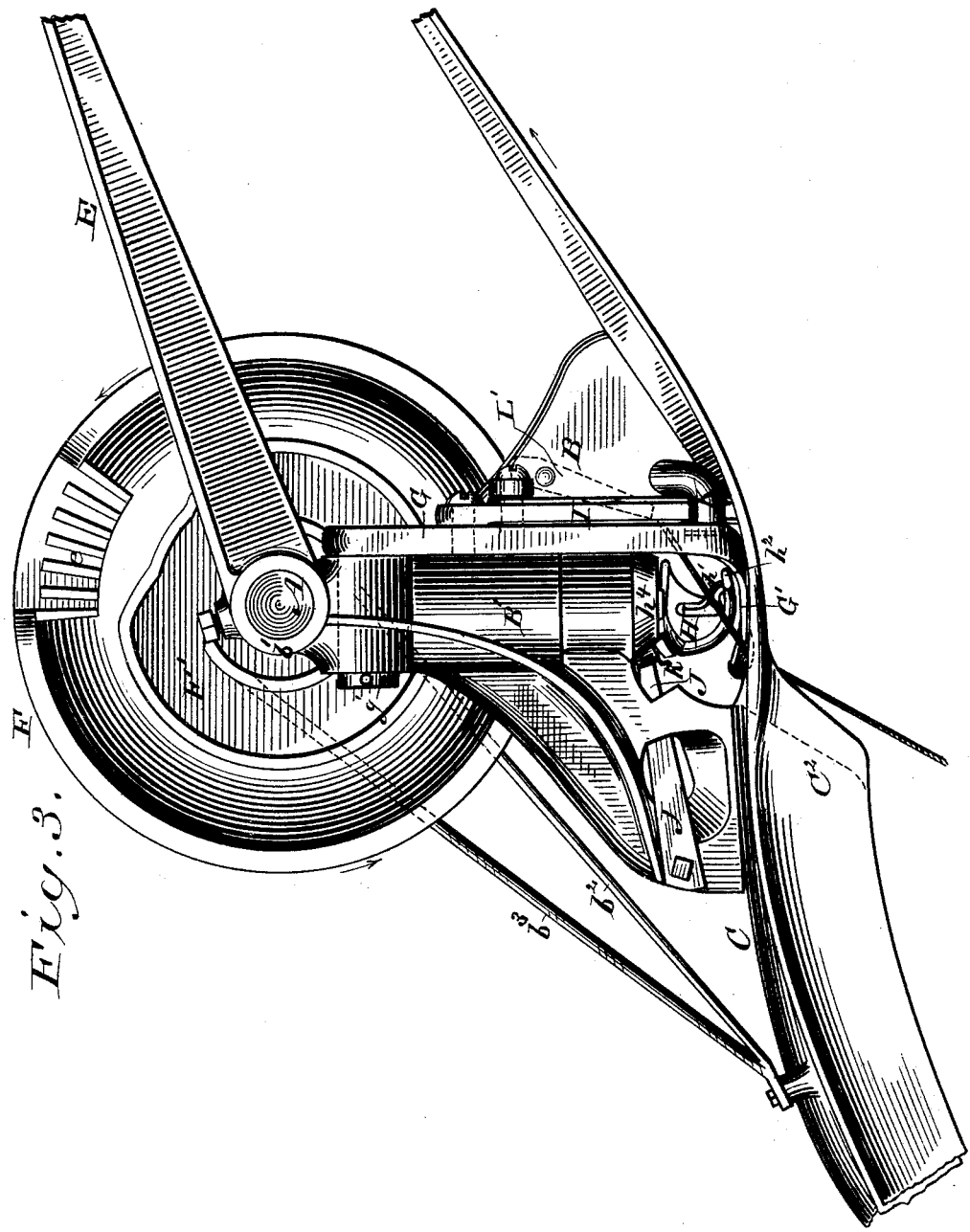
Figure 8:
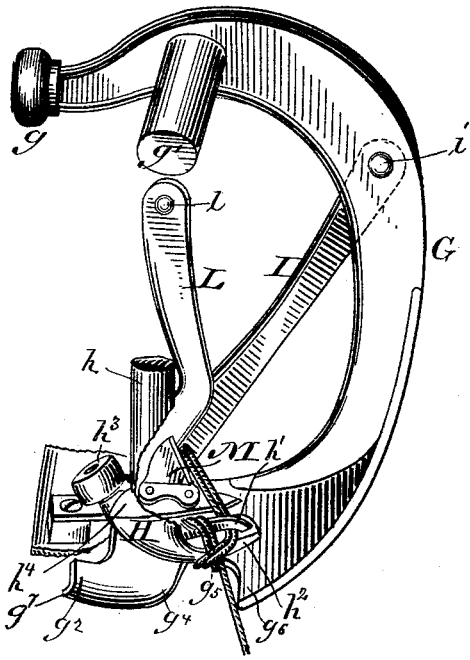
Figures 10, 11:
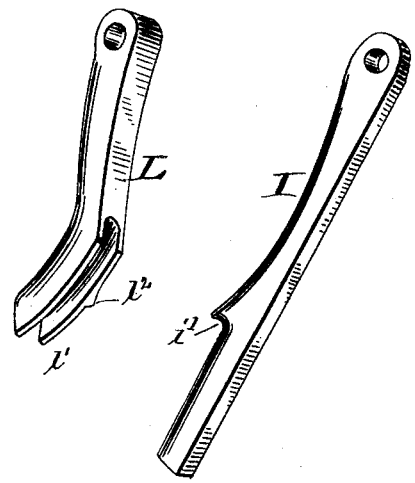
Figure 9:
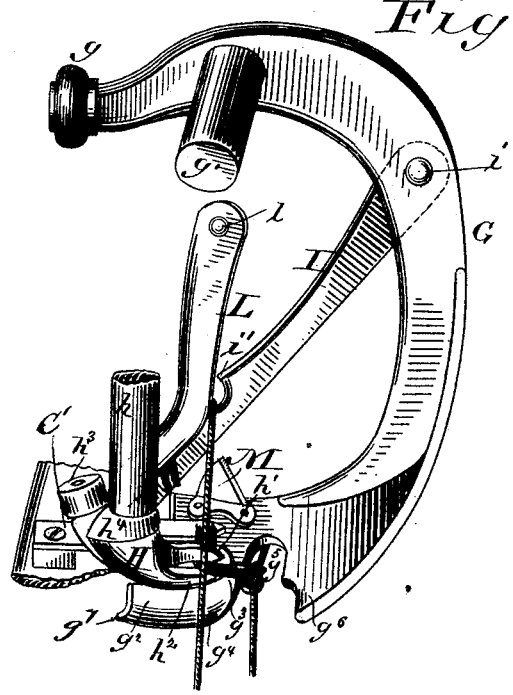
Figure 13:
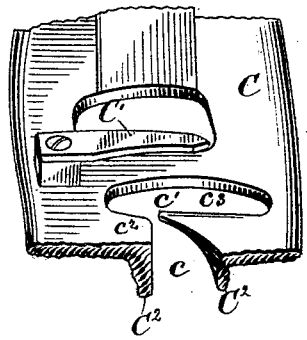
Figure 20:
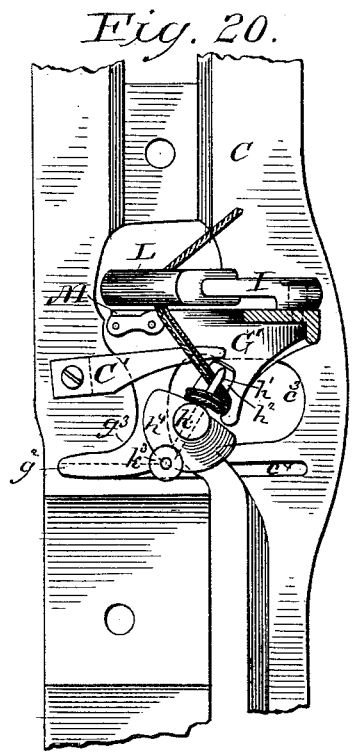
Figure 19:
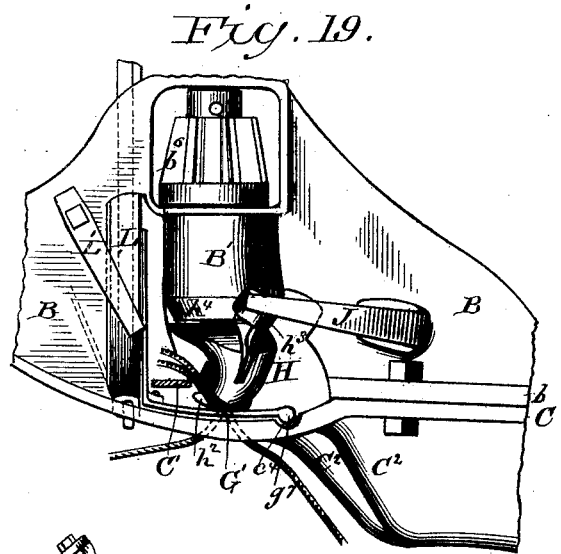
Figure 18:
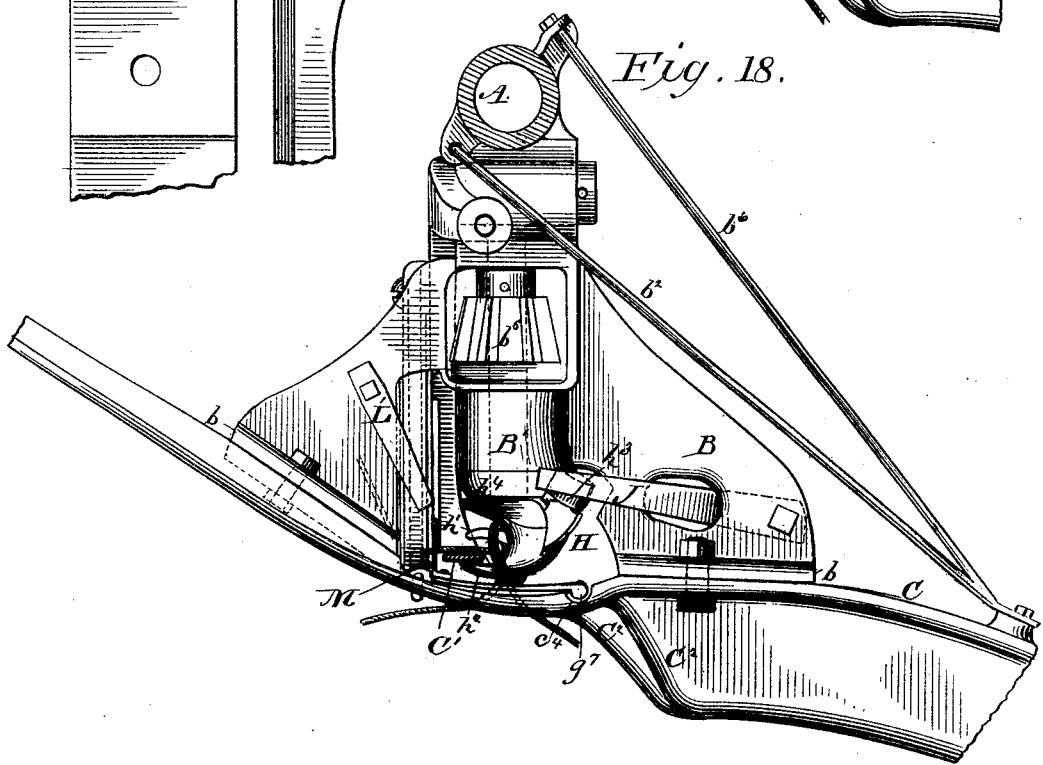

Figure 1 is a perspective view of the binding apparatus, omitting the decking, as seen from the rear and grain side thereof. Fig. 2 shows a front elevation, partly in section; and Fig. 3, a similar rear view, the parts being shown in the three preceding views in the attitude they assume just after discharging the bound sheaf. Fig. 4 shows an elevation looking toward the grain side, partly in section, with portions of the supporting-frame and braces removed. Fig. 5 shows a similar view with still more of the parts removed, those remaining being, however, shown in the same relative position as in the preceding figure. Fig. 6 shows a similar view of the same parts as Fig. 4 when seen from the opposite direction—that is, looking toward the stubble side; and Fig. 7, a like view of the parts shown in Fig. 5. Fig. 8 is a view in perspective of the cord holding, cutting, and knotting mechanism detached, showing some of the parts represented in Figs. 4 to 6 on an enlarged scale in the attitude assumed just before cutting the cord; and Fig. 9 is a similar view of the same parts, showing their relation just as the knot is being drawn from the tying-bill. Fig. 10 is a detail view of the cord-carrier; and Fig. 11, a similar view of the under side of the cord-clamp, which fits on the lower part of the plunger or sliding jaw of the cord carrier or holder. Fig. 12 is a detail view of the knotter; Fig. 13, a detail perspective view of the central part of the breast-plate. Fig. 14 is a detail plan view of the shield or breast-plate, its slots, and bridge. Fig. 15 is a detail plan view, partly in horizontal section, just above the tying-bill, showing the relative positions of the parts and cord when the knotter has made about one-fourth of a revolution. Fig. 16 is a similar view showing the relation of these parts at the moment of the discharge of the knot from the tying-bill. Fig. 17 is a detail plan view, partly in transverse section, of the tying-bill and cord-holder. Fig. 18 is a front elevation somewhat similar to Fig. 2, but showing more particularly the relation of the knotter-jaws, the bridge, the cord-holder, and the cord just before it is cut prior to the completion of the knot. Fig. 19 is a similar view showing the attitude assumed by these parts just after severing the cord; and Fig. 20, a plan view, partly in section, showing the relation of these parts just before the cord is severed.

The main driving-shaft A turns in a pipe-box bearing in the overhanging arm B' of the U-shaped supporting-frame B⁴ and is driven by the gear-wheel A³, as usual.

A breast-plate or shield C, with the usual slots therein, is bolted to the laterally-projecting feet or flanges $b$ of a knotter-frame B, provided with a loose sleeve $b'$, through which the driving-shaft A passes. The shield is connected near its forward end with projections on the overhanging arm by forked braces $b^2$ $b^3$, as usual. The knotter-frame is secured to the shield parallel with and in front of the slot $c$. Its feet $b$ also project on the front side only, so that the needle may traverse close thereto. The knotter-shaft $h$, Fig. 12, turns in a bearing B' in this frame, and is driven by a pinion $b^6$ thereon engaging at proper times with the sector-gear $e$ on the cam and gear wheel. The frame is substantially triangular in side view and narrow when seen endwise, but strengthened by ribs cast thereon. It affords bearings for the other parts of the mechanism also.

The peculiarities of the shield are more particularly exemplified in Figs. 13, 14, 15, and 16. The needle-slot $c$ extends backward to a point within the circuit of the knotter, where its rear wall is deflected inwardly and forward, forming a finger $c'$, which projects athwart the slot $c$ and behind a shoulder $c^2$ on the front wall of the slot, which curves forward at this point and terminates in an enlarged opening $c^3$, the longitudinal axis of which is transverse to the narrow front part $c$ of the slot. The knotter revolves over this opening, its shaft being in advance of the front wall of the slot and near the point of the finger, so that the cord may be laid close to the shaft by the needle.

An elastic overhanging guide-bar C' is secured at one end to the shield, its overhanging end extending parallel with the rear wall of the opening and just above it. The lower jaw of the knotter passes under this guide-bar and its upper one over it to strip the cord therefrom. (See Fig. 17.)

A bowl-shaped cam and gear wheel F, turning with the driving-shaft, has a sheaf-discharging arm E' mounted thereon. A similar arm E is carried on the rear end of this shaft, as usual. Sector teeth or gears $e$ on the inner or rear face of this bowl or cam and gear wheel impart a single revolution to the knotter at the proper times.

A cam-guide F' on the inner side of the bowl or cam and gear wheel acts on a friction-roller $g$ on an elbow-lever or arm G, vibrating on a fulcrum or pivot $g'$ on the bracket-frame B. This elbow-lever vibrates in a plane parallel with and on the outer or stubble side of the tubular bearing B' of the knotter shaft or spindle $h$, which is practically perpendicular to the shield or breast-plate C. This elbow-lever is C-shaped, its lower end being curved or bent inward and flattened out into a foot G', shaped as shown in Figs. 15 and 16. A toe $g^2$ projects in front of this foot, and also extends laterally athwart the cord-slot $c$, across which it traverses at suitable intervals. The relation of this toe to the slot is such that in its normal or backward position (see Fig. 16) the toe extends across the slot, and thus prevents the strands from slipping over the point of the toe; but when the toe advances the strands can escape over the heel $g^4$ on the neck or shank $g^3$, which connects the toe and foot, into a recess $g^5$, one side of which is formed by a projection $g^6$, and thus pass into the eye $c^3$, as hereinafter more fully explained. The front edge of the toe is bent downward, so as to form a flange $g^7$, which traverses corresponding transverse grooves $c^4$ in the breast-plate on each side of the cord-slot $c$ just in front of the guide-finger $c'$ and of the point where the slot expands into the enlarged opening $c^3$. (See Figs. 2, 14, 15, and 16.) This organization compels the strands to pass over the toe and prevents them from escaping under it in either direction.

The knotter or tying-bill H is of well-known construction, consisting of two jaws $h'$ $h^2$, the upper one $h'$ of which moves on a pivot to open and close the jaws, being actuated by means of a friction-roller $h^3$, traversing a cam $h^4$ on the spindle-bearing B', and by a plate-spring J on the bracket-frame, as usual.

The sliding jaw of the cord-holder is shown as consisting of a lever I, the upper end of which is connected by a pivot $i$ with the elbow-lever G, so that the sliding jaw vibrates parallel therewith across the plane of the cord-slot $c$ and on the outer or stubble side of the elbow-lever. The lower end of the lever I slides endwise over a horn or support K, mounted on the bracket-frame. (See Figs. 3, 4, and 5.) A notch or shoulder $i'$ on the sliding jaw catches the strands when laid therein by the binder-arm and carries them downward and forward laterally toward the knotter-spindle, as hereinafter more fully explained.

The cord-clamp consists of a lever L, connected at its upper end to the frame by a pivot $l$ and vibrating in the same plane with the sliding jaw, against which it is constantly pressed by a plate-spring L', Fig. 7. A trough or groove $l'$ in the heel or lower end of this clamp constitutes a shoe which fits on and slides over the sliding jaw I just in advance of the shoulder $i'$. (See Figs. 8, 9, 10, and 11.)

An offset $l^2$ on the lower outer side of the shoe serves to hold down the strands pushed past it by the sliding jaw, as hereinafter described, and holds them while being cut by a knife M, mounted on the laterally-oscillating foot G. The front edge of this knife is dull and inclined, so that it may readily pass under the strands in moving forward, while the rear edge is sharp, so as to cut them on its backward movement.

The needle or binder arm N vibrates with a shaft $n$, turning in a pipe-box bearing in the lower branch $B^4$ of the U-shaped frame above mentioned. Fig. 1 shows the mechanism for actuating this binder-arm, and also the packing, compressing, and tripping devices; but the construction and operation of these devices being well known and forming no part of the subject-matter claimed, detailed description of them is unnecessary.

The following is a description of the operation of the binding mechanism: The binder-arm advances through the cord-slot $c$, inserts a strand of the cord in the notch $i'$ of the holder between the sliding jaw I and clamp L, as shown in Fig. 9, and retracts, leaving the cord stretched athwart the space between the shield and decking, all in usual ways, the cord being shoved down by hand or by working the sliding jaw past the offset $l^2$ of the clamp-lever L, which offset always holds at least one strand of the cord there. The inflowing grain crowds against this cord and against the usual compressors and tripping devices, aided by the ordinary packers and separators. The cord overlies the toe $g^2$, which extends athwart the cord-slot $c$, just in front of the guide-finger $c'$, (see Fig. 16,) and temporarily blocks the slot, and over the jaws of the tying-bill, which lie over the enlarged opening or eye $c^3$ of the slot, preferably pointing obliquely backward relatively to the line of movement of the sheaf. After sufficient grain has accumulated to form a gavel, the tripping mechanism throws the binding mechanism into gear again, as usual. The binder-arm again advances through the cord-slot and carries the other strand of cord into the notch $i'$ of the sliding jaw of the cord-holder, as before, the binding-arm remaining, as usual, in this advanced position until after the strands are severed, leaving the cord clamped in the notch, as before, in a manner hereinafter explained. This second strand of the cord is carried downwardly and laterally by the shoulder $i'$ of the sliding jaw in its advance movement past the offset $l^2$ and against the first strand, where they are both securely held by the clamp until cut by the knife as the knot is formed. As the binder-arm advances to lay the second strand in the holder it tightens the cord around the gavel, which slides outwardly along the downwardly-projecting ribs $C^2$ of the shield until it reaches a point just in front of but below the toe $g^2$, from which point the ribs slope rapidly upward and outward to allow the gavel to be drawn close up to the knotter or tying-bill, which rotates directly over the enlarged opening $c^3$ of the slot, the rear edge of the knotter-spindle lying, it will be seen, in the plane of the front edge of the cord-slot. (See Figs. 15 and 16.) As before remarked, the toe $g^2$ at this moment extends across the slot and prevents the passage of the cord. The front flange of the toe projects into the cross-grooves $c^4$ and prevents the cord escaping under the toe. The tying-bill now commences to rotate in the direction of the hands of a watch, with the two strands of cord overlying it close to the knotter-spindle, and carries them with it, as usual. Simultaneously with this movement the foot G' swings or moves laterally across the plane of the cord-slot from rear to front, or in the direction in which the toe $g^2$ points, thus causing the toe to pass in front of and across the slot to clear it and allow the strands to slip over the heel $g^4$ into the recess $g^5$ on the foot, the parts of which having in the meanwhile changed their relative relation from that shown in Figs. 9 and 16 to that shown in Figs. 8 and 15. The toe $g^2$ is connected with the foot by a neck $g^3$. As the cord tightens when the knotting begins, the strands slip over the heel $g^4$ and simultaneously enter the recess $g^5$ and the enlarged opening $c^3$ in the slot which it overlies, the cord having previously been deflected behind the shoulder $c^2$ by the guide-finger $c'$. As the recess $g^5$, as well as the enlarged opening $c^3$, extends back of the knotter-spindle, the cord slackens as it passes outward, and is thus given the amount of slack necessary for the formation of the knot without undue strain on the cord held in the tying-bill jaws. As the foot G' advances athwart the plane of the cord-slot, the sliding jaw I is correspondingly advanced, shoving the doubled cord before it downward and forward from the position shown in Figs. 9 and 16 to that shown in Figs. 8 and 15, the effect of which is to carry the strands in front of or laterally beyond the knotter-spindle and over the elastic guide-bar C', which projects over the shield and parallel with it and with the rear wall of the enlarged opening $c^3$, as clearly shown in these figures. The clamp L, being pivoted on a fixed part of the frame, describes an arc around its pivot as the sliding jaw pushes it before it in the advancing movement. This tends to lift it slightly, so that the strands are carried downward under it as the shoulder $i'$ enters the trough $l'$ of the shoe until the strands have slipped over the offset $l^2$ on the clamp, when the forward movement ceases and the strands are held securely clamped. (See Fig. 8.) That end of the strand connected with the binder-arm is of course drawn down by this movement outside of the cord-holder or on the side farthest from the knotter, as usual, so as to leave it fastened when the strands are cut on the opposite side of the cord-holder. As the foot G' advances, as above described, the inclined dull-edged front of the knife M slides under the doubled cord in front of the holder, the cord afterward being carried below its top, as shown in Fig. 8. On the backward movement of the foot, which begins about the time the knotter has completed, say, three-fourths of its circuit and ends just before the bundle is discharged, the sharp edge of the knife is pressed against the strands, at this moment pretty tightly held between the knotter and cord-holder, (see Fig. 20,) and cuts them with a sliding or drawing cut, which is very effective, leaving, however, the binder-arm strand clamped within the cord-holder, as before explained. (See Fig. 16.) Returning to the knotting operation at the moment when the knotter begins its revolution, as above described, with the strands lying over it and in the recess and enlarged opening $c^3$, (see Fig. 15,) the jaws of the tying-bill open as they revolve, as usual, the under jaw passing under the spring guide-bar C', while the upper (the movable one in this instance) sweeps over it, sweeping therefrom the double strands lying thereon and grasping them securely between the jaws just before they are cut by the backward movement of the knife, Fig. 18. The downward yielding of the spring guide-bar as the jaws seize the cord lying thereon relieves the strain on the strands to some extent. The knot is then tied, as usual, and stripped from the jaws of the knotter by the continued backward movement of the foot G'. The knotted cord, it will be seen by Fig. 16, lies over the neck $g^3$ of the foot, and this neck operates so as to strip the severed strands from the knotter-jaws by a direct pull.

Those parts of the cord-slacking apparatus consisting of the neck and toe or finger of the laterally-moving foot, it will be observed, lie in front of the knotter-spindle relatively to the feed of the cord, and as the cord at the beginning of this movement overlies the toe an extra amount of string is provided and retained until the cord tightens around the bundle and the second strand is clamped in the cord-holder. As the knotter rotates, this cord drops into the recess of the foot as the toe or supporting-finger clears the cord-slot and allows the cord to enter the recess in the foot, thus yielding ample slack cord for the knot without undue strain on the cord.

The tying bill spindle, it will be observed, rotates in a fixed position, with its rear side in about the same vertical plane as that of the front edge of the cord-slot, but in a higher plane, so that the tying-bill rotates above the enlarged opening and the foot which traverses over said opening. This enlarged opening is elongated transversely to the plane of the cord-slot, the tying-bill rotating centrally over its front portion and leaving the back portion free for the discharge of the knot. The periphery of this opening aids in guiding and holding the strands as they are twisted around the bill and co-operates effectively with the recessed foot in stripping the knot from the jaws of the tying-bill.

The tying-bill spindle $h$ is also made cam-shaped, (see Figs. 15 and 16,) the bulge of the cam being opposite the nose of the bill. Owing to this construction and to the normal position in which the bill stands, as hereinbefore explained, the binder-arm is enabled to pass close to the spindle and to lay the cord well on to the bill. (See Fig. 16.)

The strands, it will be seen, never leave the recess $g^5$ in the foot after once entering it until the knot is completed. As the strands slip past the heel $g^4$, they are caught by the nose of the tying-bill and carried round by it, (see Fig. 15,) the recess $g^5$ being at the same time carried laterally under the tying-bill spindle, where it remains until the bill has nearly completed its rotation, when it moves back into the position shown in Fig. 16, where the foot has moved so far beyond the nose of the bill that the cord is stretched over the neck $g^3$, which in effect constitutes a suspended bridge, that the pull of the cord is directly in the line of the bill, and the prompt and effective release of the strands from the bill is thus easily effected by the combined action of the discharging-arms of the neck $g^3$ and the lateral movement.

As heretofore stated, the tying-bill is so organized as to make but one complete revolution and always to stop with its bill pointing in the same direction—that is, preferably obliquely backward relatively to the line of movement of the cord, but pointing directly in the line of the pull on the cord in releasing it from the tying-bill, the latter being the important requisite.

The pivoting of the sliding-jaw cord-holder, carrier, or pusher on the same vibrating elbow-lever that carries the cord-guide or toe $g^2$ secures the proper coincidence of movement in a very simple way to carry the cord around the bill and prevent its escape until the proper moment.

The pivoting of the yielding spring-clamp on the bracket-frame and its co-operation with the cord-holder secure an effective and simple clamping mechanism.

It will be obvious that as the cord passes into the recess $g^5$ coincidently with the outward movement of the bundle during the formation of the knot the cord is slackened by this approximation of the bundle to the knotter in front of the knotter during the earlier part of the formation of the knot, while it is also slacked somewhat during the latter stages of this formation by the lateral movement of the cord-carrier and the downward deflection of the spring-guard just before the strands are cut. The downward movement of the cord toward the knotter also slacks the cord. The advantages of such an organization as mine are thus rendered evident.

Having thus fully described the construction, organization, and operation of my improved automatic cord-knotting grain-binding mechanism, what I claim therein as new and of my own invention, and desire to secure by Letters Patent of the United States, is—

1. The combination, substantially as hereinbefore set forth, of the knotter-shield having a cord-receiving slot therein, a fixed cord-guiding finger projecting athwart said slot, a frame mounted on the shield, a tying-bill rotating spindle in front of and above said slot, a driving-shaft mounted in bearings in said frame, a cam and gear wheel rotated by said shaft, gearing actuating the tying-bill intermittently, an elbow-lever vibratable laterally by the cam and gear wheel, the pivot on which said lever rocks, a cord-guiding foot carried by the elbow-lever, the sliding jaw of the cord-holder vibratable athwart the plane of the cord-slot and pivoted on the elbow-lever, and the cord-clamp pivoted on the frame and vibratable with the sliding jaw, whereby the cord is carried laterally past or in advance of the tying-bill on opposite sides thereof.

2. The combination, substantially as hereinbefore set forth, of a knotter-shield having a cord-slot therein, a frame mounted on the shield, the elbow-lever pivoted outside (or on the stubble side of) the knotter, a cord-guiding foot mounted on the said elbow-lever projecting underneath the knotter and vibratable intermittently across the plane of the cord-slot, a sliding jaw pivoted on the elbow-lever and vibratable transversely athwart the plane of the cord-slot, a cord-clamp pivoted on the frame and vibratable in contact with and in the same plane as the sliding jaw, and a guide-horn on the frame over which the sliding jaw traverses to carry the cord laterally toward the knotter-spindle.

3. The combination, substantially as hereinbefore set forth, of a knotter-shield having a cord-receiving slot therein, a knotter-frame, an elbow-lever pivoted thereon outside or on the stubble side of the knotter-shaft, a cord-guiding foot on said elbow-lever extending under the knotter and vibratable intermittently across the cord-slot, a cord-holder sliding jaw pivoted upon and moving intermittently and coincidently with the elbow-lever, a cord-clamp pivoted on the frame bearing on the sliding jaw and vibratable coincidently therewith, a spring pressing the clamp against the sliding jaw, and mechanism actuating the knotter and elbow-lever.

4. The combination, substantially as hereinbefore set forth, of a knotter-shield having a cord-receiving slot therein, a knotter-frame, a tying-bill rotating on a spindle at one side of and above said slot, a driving-shaft mounted in bearings in said frame, a cam rotated by said shaft, gearing actuating the tying-bill intermittently, an elbow-lever vibratable laterally and intermittently across the cord-receiving slot, a pivot on which the elbow-lever vibrates, a cord-guiding foot carried by the elbow-lever, a cord-holding sliding jaw movable coincidently with the cord-guiding foot, the pivot on which the sliding jaw rocks carried by the elbow-lever, the cord-clamp, the pivot on which the cord-clamp rocks, and a spring insuring the engagement of the sliding jaw and cord-clamp during all their vibrations, as specified.

5. The combination, substantially as hereinbefore described, of a knotter-shield having a cord-receiving slot therein, a fixed guide-finger projecting across the slot, a cord-guiding foot, a cord-supporting finger vibratable across the slot and over the guide-finger, a knotter rotating over the foot, a yielding or elastic guide-bar behind and within the circuit of the knotter over which the cord is laid by the cord-holder to insure its entrance between the jaws of the knotter, and the sliding jaw and clamp moving parallel with the guide-bar.

6. The combination, substantially as hereinbefore set forth, of a knotter-shield having a cord-receiving slot therein, a fixed guide-finger therein, a cord-supporting foot vibratable across the slot in advance of the knotter, a knotter rotating over the foot, a cord-holder consisting of a sliding jaw and clamp vibratable with the foot but behind the knotter, a binder-arm which lays the cord in the holder, and the actuating mechanism.

7. The combination, substantially as hereinbefore set forth, of the vibratable elbow-lever, its foot, the recess $g^5$ therein, the cord-holder sliding jaw, its pivot on the elbow-lever, the clamp, its pivot, and the spring pressing it against the lever.

8. The cord-carrier herein described, consisting of the combination of the elbow-lever, the sliding jaw pivoted thereon, its cord-holding notch $i'$, the support over which it slides mounted on the knotter-frame, the cord-clamp and its actuating-spring pivoted on the frame, the trough-shaped foot of the clamp fitting over the sliding jaw, and the cord-holding offset $l^2$ on the clamp, whereby the cord is clamped and carried toward the knotter-spindle.

9. The combination, substantially as hereinbefore set forth, of the elbow-lever, the cord-guiding foot, the knife fixed thereon, the sliding jaw pivoted on the elbow-lever, and the spring-clamp on the frame, the foot, the knife, the sliding jaw, and clamp all vibratable in parallel planes, whereby the knife is caused to slide past the cord as it is carried toward the knotter and to sever it on the back-stroke after its strands have been seized by the tying-bill.

10. The combination, substantially as hereinbefore set forth, of a knotter, a cord guide and support vibratable laterally athwart the cord-slot in advance of the knotter, and a sliding jaw and clamp constituting a laterally-vibratable cord-carrier in rear of the knotter, whereby the cord is positively forced toward the knotter on both sides thereof.

11. The combination, substantially as hereinbefore set forth, of the pivoted vibratable cord guiding and supporting foot, the sliding jaw of the holder pivoted thereon, and the clamp pivoted on the frame and bearing on the sliding jaw, and all three vibrating in parallel planes athwart that of the cord-slot.

12. The combination, substantially as hereinbefore set forth, of a knotter-shield having a cord-slot terminating in an enlarged opening, a knotter revolving thereover, and a yielding or elastic overhung cord-guide in rear of the enlarged opening (supported at one end only) traversed by the open jaws of the knotter and adapted to yield to the strain on the cord.

13. The combination, substantially as hereinbefore set forth, of the knotter, the laterally-vibratable cord-holder, and the interposed bridge or cord-guide in rear of the enlarged opening over which the strands are laid by the holder and from which they are swept by the knotter-jaws.

In testimony whereof I have hereunto subscribed my name.

LEWIS MILLER.

Witnesses:
O. L. SADLER,
W. K. MEANS.